United States Patent
Barton et al.

(10) Patent No.: US 7,093,121 B2
(45) Date of Patent: Aug. 15, 2006

(54) TRANSFERRING DATA VIA A SECURE NETWORK CONNECTION

(75) Inventors: Christopher Andrew Barton, Buckingham (GB); Graham Andrew Clarke, Aylesbury (GB); Simon Crowe, Milton Keynes (GB)

(73) Assignee: McAfee, Inc., Santa Clara, CA (US)

(*) Notice: Subject to any disclaimer, the term of this patent is extended or adjusted under 35 U.S.C. 154(b) by 737 days.

(21) Appl. No.: 10/041,482

(22) Filed: Jan. 10, 2002

(65) Prior Publication Data

US 2003/0131259 A1    Jul. 10, 2003

(51) Int. Cl.
*H04L 9/00* (2006.01)

(52) U.S. Cl. .................. 713/150; 726/22; 726/23; 726/24; 726/25; 726/2; 713/188; 709/203

(58) Field of Classification Search ............ 713/201, 713/151–181, 188; 709/203, 218; 380/282; 726/2, 22–25
See application file for complete search history.

(56) References Cited

U.S. PATENT DOCUMENTS

| | | | |
|---|---|---|---|
| 6,266,420 B1* | 7/2001 | Langford et al. | 380/282 |
| 6,324,648 B1* | 11/2001 | Grantges, Jr. | 713/201 |
| 6,584,567 B1* | 6/2003 | Bellwood et al. | 713/171 |
| 6,728,886 B1* | 4/2004 | Ji et al. | 713/201 |
| 6,826,593 B1* | 11/2004 | Acharya et al. | 709/203 |
| 2002/0023143 A1* | 2/2002 | Stephenson et al. | 709/218 |
| 2004/0015725 A1* | 1/2004 | Boneh et al. | 713/201 |

OTHER PUBLICATIONS

Robinson, Peter, "Understanding Digital Certificates and Secure Sockets Layer (SSL)" Jan. 2001 Version 1.1.

* cited by examiner

*Primary Examiner*—Kim Vu
*Assistant Examiner*—Baotran N. To
(74) *Attorney, Agent, or Firm*—Zilka-Kotab, PC; Christopher J. Hamaty (57) ABSTRACT

A request for secure data sent from a client computer 2 to a webtsite server computer 4 is redirected to a proxy computer 6. A secure connection is established with the proxy computer 6 using a protocol such as HTTP and Certificate Exchange. The proxy computer 6 then establishes its own secure connection with the website server 4. The data requested is passed in encrypted form from the website server computer 4 to the proxy computer 6. The proxy computer 6 decrypts this data and then scans it for illegal content, such as computer viruses, worms, Trojans, banned computer files, banned words, banned combinations of words or banned images and the like. Providing no illegal content is found, the data is encrypted again for transfer over the secure link between the proxy computer 6 and the client computer 2. The proxy computer 6 may conveniently be the firewall computer within a local area network.

16 Claims, 5 Drawing Sheets

TRANSFERRING DATA VIA A SECURE NETWORK CONNECTION

BACKGROUND OF THE INVENTION

1. Field of the Invention

This invention relates to the field of data processing systems. More particularly, this invention relates to the transfer of data via a secure network connection.

2. Description of the Prior Art

The exchange of data via computer networks is becoming increasingly widespread. The adoption of the use of the internet as a way of making network connections is firmly established. The pervasive nature of the Internet has strong advantages in terms of the flexibility it allows and the wide access to data from different sources that is provided. A problem with transferring data via the internet is maintaining the security of that data. The data being exchanged may be confidential, such as credit card or bank details, or might be subject to an unauthorised alteration, such as inserting computer virus code or offensive content into the data being exchanged.

One way of addressing the security issues discussed above is by the use of secure network protocols such as HTTPS. With such protocols, when a client computer wishes to retrieve some data from a server computer, it first establishes a secure connection with that server computer by issuing a HTTPS connection request to the server and waiting for an appropriate Certificate to be returned from the server. Once the secure connection has been established in this way, data can be exchanged across the secure connection in an encrypted form such that its confidentiality may be maintained or to resist tampering with that data. This type of arrangement is well known and has strong advantages.

It is known to provide firewall computers for scanning network traffic for illegal content. A company computer network may typically make its internet connection via a firewall computer such that inbound and outbound traffic to the internet can be scanned for illegal content. A significant problem with this arrangement arises when the client computer and the server computer which are communicating via the firewall computer are connected by a secure link of the type in which the data being transferred is encrypted. As a result of the encryption of the data passing through the firewall computer, the firewall computer is no longer able to scan that data for illegal content. Whilst such secure network connections may be good at maintaining the confidentiality of data being exchanged, they do not in themselves ensure that the data does not contain illegal content, such as offensive material that is banned as a matter of company policy, or malware such as computer viruses, worms, Trojans, spyware etc.

SUMMARY OF THE INVENTION

Viewed from one aspect the present invention provides a computer program product for controlling a proxy computer to transfer data via a secure network connection, said computer program product comprising:

first link establishing code operable to establish a first secure link between a first computer and said proxy computer;

second link establishing code operable to establish a second secure link between said proxy computer and a second computer;

receiving code operable to receive at said proxy computer said data in encrypted form from said second computer;

decrypting code operable to decrypt said data at said proxy computer;

scanning code operable to scan said data at said proxy computer for illegal content and triggering illegal content found action if illegal content is found within said data; and sending code operable to send said data in encrypted form from said proxy computer to said first computer.

The invention recognises that the confidentiality of the data being exchanged may be maintained and yet the data be made accessible to be scanned for illegal content if the exchange of data is made via a trusted proxy computer. The client computer may issue its secure connection request via the proxy computer. The proxy computer can intercept this request and establish its own secure link with the client computer. The proxy computer can then go on to establish its own secure link with the original target server computer and retrieve the requested data on behalf of the client computer. Since the proxy computer established the secure link with the server computer, it is able to decrypt and scan for illegal content the data returned from the server computer before passing it on, again over a secure link in an encrypted form to the client computer. Thus, the data is always encrypted as it is being transferred over the network links so as to help maintain its confidentiality and yet the data is able to be scanned for illegal content before it is delivered to the client.

It will be appreciated that the first computer and the second computer between which data is being transferred via the proxy computer could take a variety of different forms, but preferred embodiments of the invention are ones in which these computers are respective ones of a client computer and a website server computer.

The data being transferred could also take a wide variety of forms, such as encrypted e-mail or the like, but the invention is particularly well suited to dealing with data in the form of secure web content.

The secure links could use many different data transfer protocols providing these protect the security of the data being transferred by encryption. However, the invention is particularly well suited to using a HTTPS secure protocols to form the network links.

The illegal content being scanned for preferably includes one or more of a computer virus, a Worm, a Trojan, a banned computer file, a banned word, a banned combination of words or a banned image. It will be understood by those in this technical art that the term illegal content does not necessarily mean that the content breaks a law, but rather than the content is categorised as undesirable, banned, unwanted by the controller of the systems concerned.

A common way in which secure links are established involves the exchange of Certificates used to authenticate associated data. The present technique can utilise this technique and reduce the impact of the system on users by providing that the proxy computer serves to issue its own Certificates to be associated with the data being transferred and the recipient computers for that data being configured to recognise the proxy computer as an authorised Certificate issuing authority.

It will be appreciated that whilst the proxy computer could be located in a variety of positions between the first and second computers, although not essential it is advantageous and fits well with other aspects of many network security environments if the proxy computer is a firewall computer.

Further aspects of the present invention also provide a method of transferring data and an apparatus for transferring data in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
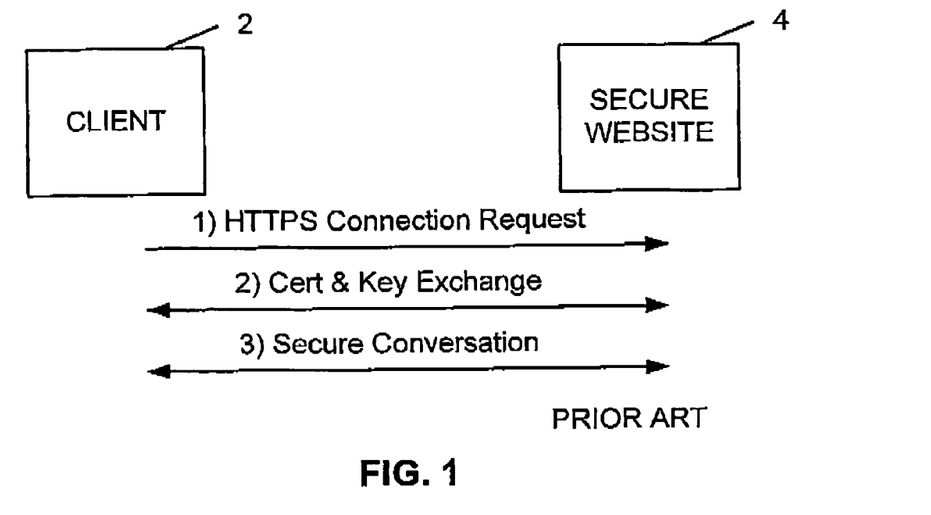
FIG. 1 schematically illustrates a known technique for secure transfer of data.

FIG. 1 illustrates a known technique for exchanging data via a secure link over the Internet. A client computer 2 wishes to access a webpage stored on a secure web server 4. As is known in Secure Socket Layer (SSL) communication, the client computer 2 issues a HTTPS connection request to the secure web site 4. The secure website 4 then returns a Certificate to the client computer 2. The client computer 2 verifies this Certificate and if this verification is successful uses the key in the Certificate to send a session specific symmetric key to the website 4 for use in order handling the exchange of encrypted data sent from the secure web site 4 to the client computer 2. Further details regarding SSL communication and establishing SSL links may be found in the document "Understanding Digital Certificates and Secure Socket Layer (SSL)" produced by Peter Robinson of Entrust, Inc and available via the internet as Version 1.1 of Jan. 2001.

Whilst the above technique is good at guarding the confidentiality of the data being passed over the internet, it suffers from the disadvantage that any firewall or other such computer in the datapath is not able to scan the data being exchanged for illegal content (e.g. search within the data for malware such as viruses, worms, Trojans, etc).

Figure 2:
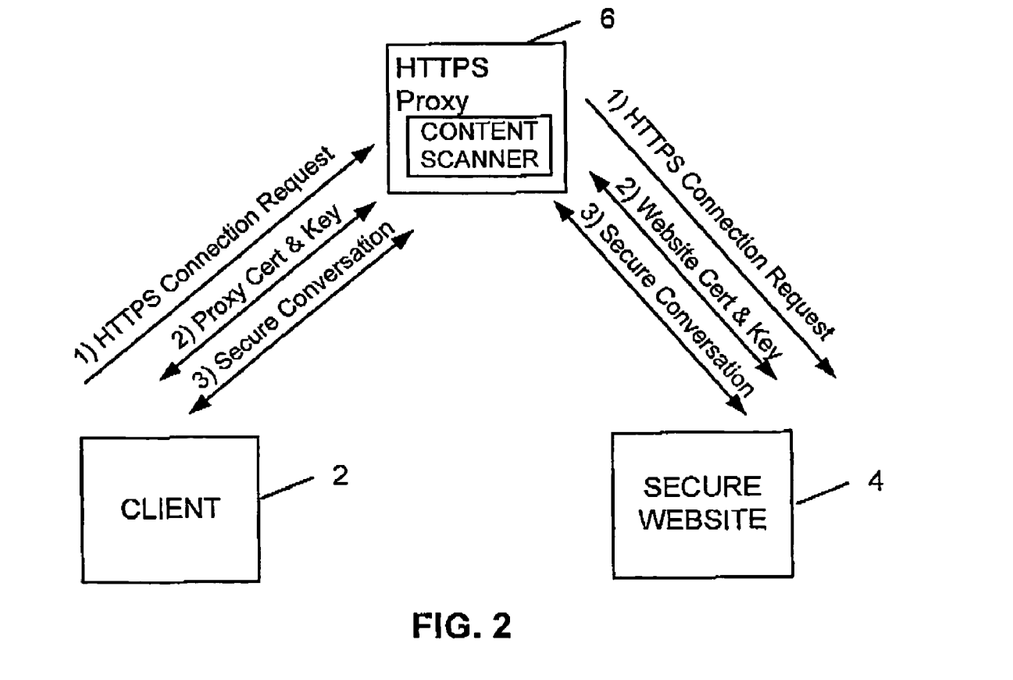
FIG. 2 schematically illustrates the secure transfer of data in accordance with one example embodiment.

FIG. 2 illustrates one example of the present technique. In this example the client computer 2 and the secure website 4 exchange their data via a HTTPS proxy computer 6. This proxy computer 6 may also serve, for example, as the firewall for a local area network to which the client computer 2 is attached. The proxy computer 6 includes a content scanner, such as scanner software which serves to detect computer viruses, Worms, Trojans, banned files, banned words, banned combinations of words, banned images and the like.

As will be seen in FIG. 2, the request for the secure HTTPS connection is redirected to the proxy computer 6. The proxy computer then returns either a default Certificate issued by itself or a Certificate obtained from an organisation such as Verisign (or other Certification Authority) for the particular web site being visited. When the Certificate is passed back to the client computer 2, providing the proxy is configured in the web browser of the client computer 2 as a Certification Authority, then the user will not be prompted to accept the Certificate as the browser already trusts the Certificate. If the proxy is not configured as a Certification Authority within the browser of the client computer 2, then the user is given the option of accepting the Certificate. If the user does not accept the Certificate, then no more communication takes place over the secure connection and the process terminates. If the user accepts the Certificate, then the user is effectively confirming the proxy computer 6 as a trusted computer whose security they accept. The client computer 2 may then send a symmetric key to the proxy computer 6 encrypted using the public key in the Certificate. The proxy computer 6 decrypts the symmetric key using its private key and uses the symmetric key for further communication with the client computer 2.

Once the proxy computer 6 has a secure connection with the client computer 2, then the proxy computer 6 makes it own HTTPS connection request to the secure website 4 that the user originally wanted to connect to as was indicated in their connection request. If that secure website 4 does not have a valid Certificate (i.e. one produced by a recognised Certification Authority), a webpage indicating that the website 4 is not secure is returned to the client computer 2 and the process terminated. If the website computer 4 has a valid Certificate that is returned to the proxy computer 6, then a secure connection is established, using the techniques mentioned above, between the proxy computer 6 and the secure website 4 over which encrypted data (encrypted using the symmetric key) is transferred. The encrypted data is decrypted within the proxy computer 6 and scanned for illegal content. The different types of legal content have been mentioned above. This type of scanner is in itself known and will not be described further herein. If illegal content is found, then this triggers an appropriate action, such as the sending of a warning webpage to the client or the issue of an alert message to a network administrator. The secure connection would also be terminated. If the content within the data scanned by the proxy computer 6 is all legal, then it is encrypted again and sent in encrypted form from the proxy computer 6 to the client computer 2 where it is decrypted by the client computer 2 for use by the user.

It will be seen that the above provides a system that serves to intercept the HTTPS negotiation and replace this with a redirect to a local secure proxy computer. This provides a secure "hop". Thus, the client requests a secure connection to a HTTPS web server across the internet. The proxy computer serving as the firewall for the client computer intercepts this HTTPS request, does not forward it to the webserver directly, but instead performs its own negotiation with the webserver. The requested data between the webserver and the HTTPS proxy is subsequently encrypted as it passes across the internet links but is able to be decrypted within the HTTPS proxy. The HTTPS proxy then uses another secure HTTPS connection through to the client computer 2 and encrypts the data as it passes over this connection providing it has passed the scanning for illegal content. In this way, anti-virus and other content scanning can occur prior to the data reaching the client computer and yet at no point does unencrypted data flow over the network.

Figure 3:
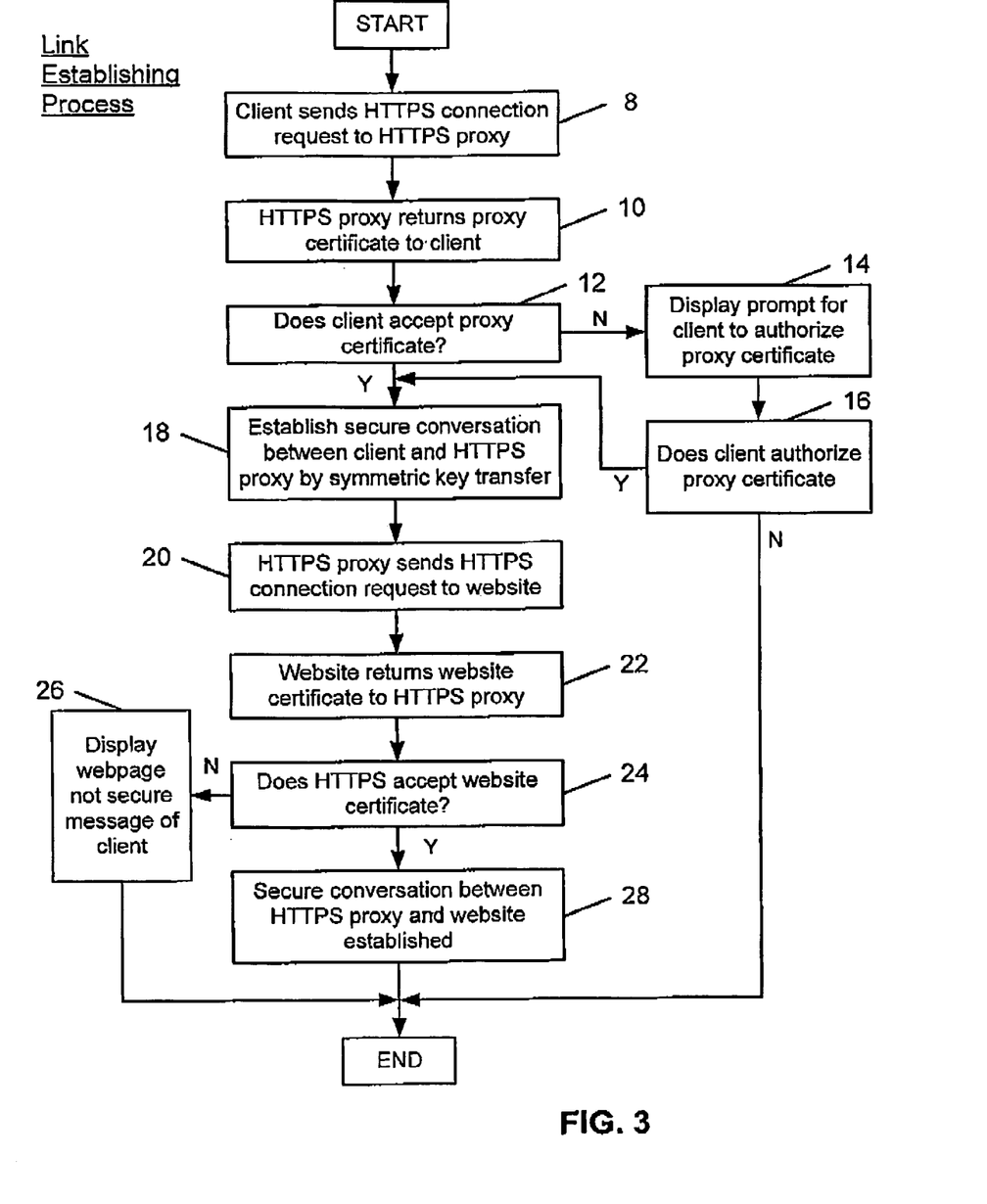
FIG. 3 is a flow diagram schematically illustrating a link establishing process.

FIG. 3 is a flow diagram schematically illustrating the establishment of the links. At step 8 the client computer 2 sends a HTTPS connection request to the proxy computer 6. At step 10 the proxy computer 6 returns the proxy Certificate to the client computer 2. At step 12 the client computer examines the proxy Certificate and determines whether or not it will accept this Certificate.

If the Certificate is not acceptable, then processing proceeds to step 14 at which a prompt to the user is displayed at the client computer 2 as to whether or not they wish to authorise the acceptance of the proxy Certificate. If the user does authorise the acceptance of the proxy Certificate, then step 16 returns processing to the main flow. Otherwise, the link establishing process terminates.

Providing the proxy Certificate has been accepted, processing proceeds to step 18 at which a secure conversation (link) between the client computer 2 and proxy computer 6 is established. Once this secure link has been established, then processing proceeds to step 20 at which the proxy computer 6 sends it own HTTPS connection request to the website server computer 4. At step 22 the website server computer 4 returns the website Certificate to the proxy computer 6. At step 24 the Certificate returned from the web site is examined by the proxy computer 6 to determine whether or not it should be accepted. If the Certificate is not accepted, then processing proceeds to step 26 at which a webpage is issued to the client computer 2 indicating that the website server 4 was not appropriately secure and the link establishing processes terminated. If the proxy computer 6 does accept the Certificate returned by the website server 4, then processing proceeds to step 28 at which a secure conversation (link) is established between the proxy computer 6 and the website server 4.

It will be seen from the above that providing both of the Certificates returned are accepted, then the process serves first to establish a secure link between the client computer 2 and the proxy computer 6 and then to establish a secure link between the proxy computer 6 and the website server computer 4.

Figure 4:
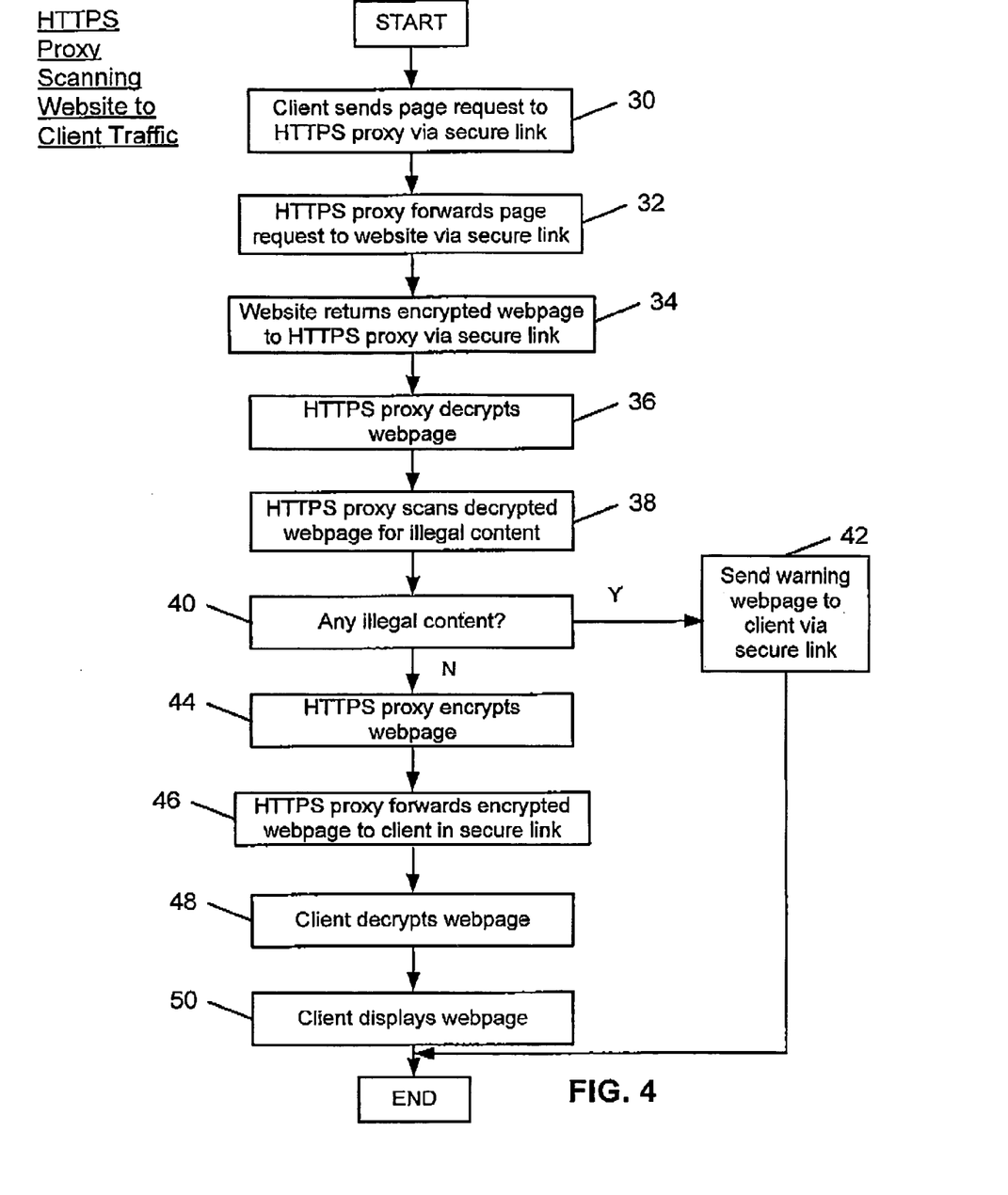
FIG. 4 is a flow diagram schematically illustrating the transfer of traffic from a web site to a client.

FIG. 4 is a flow diagram schematically illustrating the transfer of data from a website to a client over the secure links established in accordance with FIG. 3. At step 30 the client computer 2 sends a page request to the proxy computer 6. At step 32 the proxy computer 6 forwards this page request to the website server computer 4. At step 34 the web site server computer 4 returns the encrypted webpage to the proxy computer 6 via their secure link. At step 36 the proxy computer 6 decrypts the webpage returned to it. At step 38 the proxy computer 6 then scans the decrypted webpage for illegal content, such as the various different types of illegal content previously described using a standard content scanner. If illegal content is detected, then step 40 directs processing to step 42 at which a warning webpage is sent to the client computer 2 instead of the requested webpage. If illegal content is not detected, then step 44 serves to encrypt the webpage that has been scanned using the encryption in place between the proxy computer 6 and the client computer 2. Step 46, then sends this encrypted webpage via the secure link between the proxy computer 6 and the client computer 2. At step 48, the client computer 2 decrypts the webpage it has received and then at step 50 displays this webpage to the user.

Figure 5:
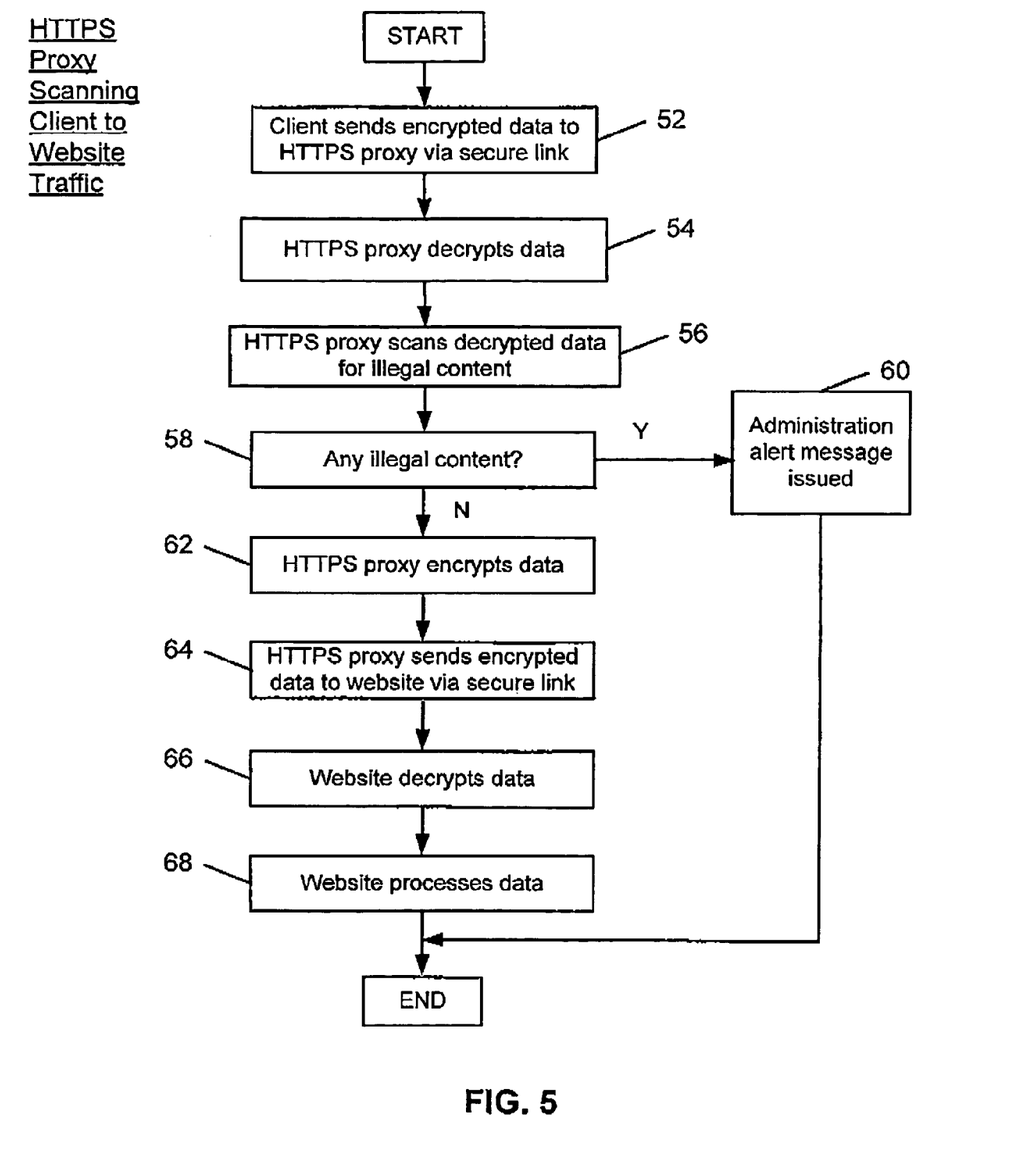
FIG. 5 is a flow diagram schematically illustrating the transfer of traffic from a client to a website.

FIG. 5 is a flow diagram schematically illustrating the transfer of traffic between a client and a website over the link established in accordance with FIG. 3. At step 52 the client computer 2 sends encrypted data to the proxy computer 6 via the secure link between the client computer 2 and the proxy computer 6. The encrypted data being sent, could for example be form data including sensitive confidential information, such as credit card numbers and passwords. At step 54, the proxy computer 6 decrypts the data received from the client computer 2. At step 56, this decrypted data is then subject to a scan for illegal content. If any illegal content is found, then step 58 serves to direct processing to step 60 at which an administrator alert message is issued for the network to which the client computer 2 is attached. It will be appreciated that many other different types of events may be triggered by the detection of illegal content. If illegal content is not detected, then processing proceeds to step 62 at which the proxy computer 6 encrypts the data again using the encryption required for communication between the proxy computer 6 and the website server computer 4. This encrypted data is then sent to the web site server computer 4 at step 64. At step 66 the website server computer 4 decrypts this data and then processes it at step 68 in accordance with its normal techniques.

Figure 6:
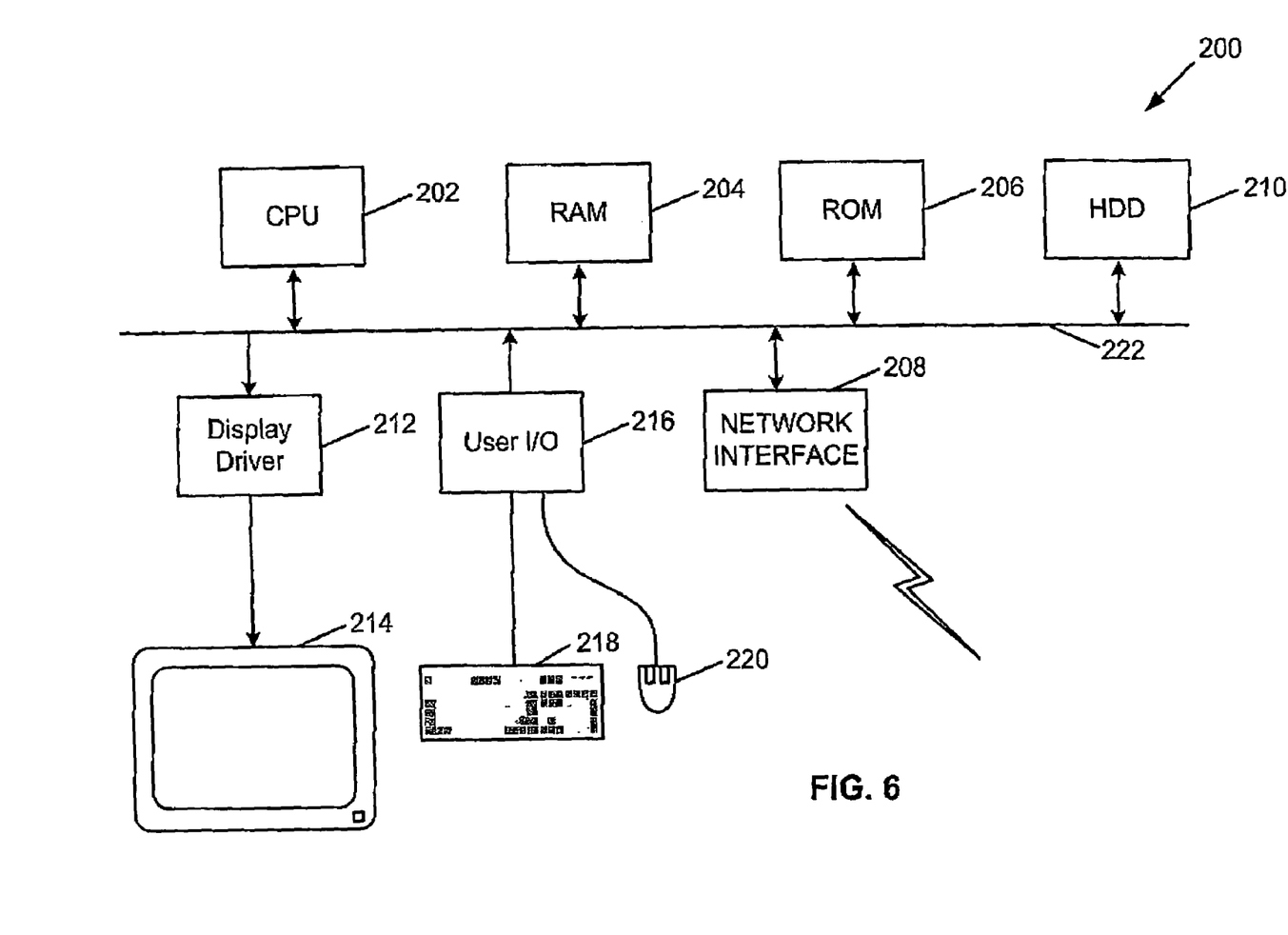
FIG. 6 is a diagram schematically illustrating the architecture of a general purpose computer of a type that may be used to implement the techniques illustrated in FIGS. 2 to 5.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example, e.g. a server may not have a screen and a mouse or keyboard.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product for controlling a proxy computer to transfer data via a secure network connection, said computer program product comprising:

first link establishing code operable to establish a first secure link between a first computer and said proxy computer;

second link establishing code operable to establish a second secure link between said proxy computer and a second computer;

receiving code operable to receive at said proxy computer said data in an encrypted un-scannable form from said second computer;

decrypting code operable to decrypt said data at said proxy computer for scanning of said data;

scanning code operable to scan said data at said proxy computer for illegal content and triggering illegal content found action if illegal content is found within said data; and sending code operable to send said data in encrypted form from said proxy computer to said first computer;

wherein further included is:
  computer code for receiving a security Certificate from said proxy computer at a client computer;
  computer code for prompting a user of said client comnuter to accent said security Certificate if said proxy computer is not configured as a Certification Authority within a browser of said client computer;
  computer code for receiving at said proxy computer from said client computer a symmetric key encrypted using a public key in said security Certificate if said user accepts said security Certificate, and
  computer code for decrypting at said proxy computer said symmetric key using a private key;
  wherein said first computer and said second computer are respective ones of said client computer accessing said data via said browser and a website server computer;
  wherein said website server computer associates said security Certificate with said data sent from said website server computer to said proxy computer for use by said proxy computer to authenticate said data and said proxy computer associates said security Certificate issued by said proxy computer with said data sent from said proxy computer to said client computer for use by said client computer to authenticate said data;
  wherein said proxy computer is a firewall computer;
  wherein said proxy comnuter uses said s 'symmetric key for communication with said client computer;
  wherein a webpage indicating that said data is not secure is returned to said client computer if said security Certificate from said website server computer is not produced by a recosnized Certification Authority;
  wherein said illegal content found action includes at least one of sending a warning webpage to said client computer and terminating said first secure link between said proxy computer and said website server computer.

2. A computer program product as claimed in claim 1, wherein said data is secure web content.

3. A computer program product as claimed in claim 1, wherein said first secure link is made using a HTTPS secure protocol.

4. A computer program product as claimed in claim 1, wherein said second secure link is made using a HITPS secure protocol.

5. A computer program product as claimed in claim 1, wherein said illegal content includes one or more of: a computer virus, a worm, a Trojan, a banned computer file, a banned word, a banned combination of words and a banned image.

6. A method of transferring data via a secure network connection, said method comprising the steps of:
  establishing a first secure link between a first computer and a proxy computer;
  establishing a second secure link between said proxy computer and a second computer;
  receiving at said proxy computer said data in an encrypted un-scannable form from said second computer;
  decrypting said data at said proxy computer for scanning of said data;
  scanning said data at said proxy computer for illegal content and triggering illegal content found action if illegal content is found within said data; and
  sending said data in encrypted form from said proxy computer to said first computer;
  wherein said method further comprises the steps of:
    receiving a security Certificate from said proxy computer at a client computer,
    prompting a user of said client computer to accept said security Certificate if said proxy comnuter is not configured as a Certification Authority within a browser of said client computer,
    receiving at said proxy computer from said client computer a symmetric key encrvuted using a public key in said security Certificate if said user accepts said security Certificate, and
    decrypting at said proxy computer said symmetric key using a private key;
  wherein said first computer and said second computer are respective ones of said client computer accessing said data via said browser and a website server computer;
  wherein said website server computer associates said security Certificate with said data sent from said website server computer to said proxy computer for use by said proxy computer to authenticate said data and said proxy computer associates said security Certificate issued by said proxy computer with said data sent from said proxy computer to said client computer for use by said client computer to authenticate said data;
  wherein said proxy computer is a firewall computer;
  wherein said proxy computer uses said symmetric key for communication with said client computer;
  wherein a webpage indicating that said data is not secure is returned to said client computer if said security Certificate from said website server computer is not produced by a recognized Certification Authority;
  wherein said illegal content found action includes at least one of sending a warning webpage to said client computer and terminating said first secure link between said proxy computer and said website server computer.

7. A method as claimed in claim 6, wherein said data is secure web content.

8. A method as claimed in claim 6, wherein said first secure link is made using a HTTPS secure protocol.

9. A method as claimed in claim 6, wherein said second secure link is made using a HTTPS secure protocol.

10. A method as claimed in claim 6, wherein said illegal content includes one or more of: a computer virus, a worm, a Trojan, a banned computer file, a banned word, a banned combination of words and a banned image.

11. A method as claimed in claim 6, wherein the security Certificate is one of a default certificate and a certificate obtained from an organization.

12. Apparatus for transferring data via a secure network connection, said apparatus comprising:
  first link establishing logic operable to establish a first secure link between a first computer and said proxy computer;
  second link establishing logic operable to establish a second secure link between said proxy computer and a second computer;
  receiving logic operable to receive at said proxy computer said data in an encrypted un-scannable form from said second computer;
  decrypting logic operable to decrypt said data at said proxy computer for scanning of said data;
  scanning logic operable to scan said data at said proxy computer for illegal content and triggering illegal content found action if illegal content is found within said data; and
  sending logic operable to send said data in encrypted form from said proxy computer to said first computer;
  wherein further included is;
  logic for receiving a security Certificate from said proxy computer at a client computer, logic for promoting a user of said client computer to accept said security Certificate if said proxy computer is not configured as a Certification Authority within a browser of said client computer, logic for receiving at said proxy computer from said client computer a symmetric key encrypted using a public key in said security Certificate if said user accepts said security Certificate, and logic for decrypting at said proxy computer said symmetric key using a private key;

wherein said first computer and said second computer are respective ones of said client computer accessing said data via said browser and a website server computer;

wherein said website server computer associates said security Certificate with said data sent from said website server computer to said proxy computer for use by said proxy computer to authenticate said data and said proxy computer associates said security Certificate issued by said proxy computer with said data sent from said proxy computer to said client computer for use by said client computer to authenticate said data;

wherein said proxy computer is a firewall computer;

wherein said proxy computer uses said symmetric, key for communication with said client computer;

wherein a webpage indicating that said data is not secure is returned to said client computer if said security Certificate from said website server computer is not produced by a recognized Certification Authority;

wherein said ideal content found action includes at least one of sending a warning webpage to said client computer and terminating said first secure link between said Proxy computer and said website server computer.

13. Apparatus as claimed in claim 12, wherein said data is secure web content.

14. Apparatus as claimed in claim 12, wherein said first secure link is made using a HTTPS secure protocol.

15. Apparatus as claimed in claim 12, wherein said second secure link is made using a HTTPS secure protocol.

16. Apparatus as claimed in claim 12, wherein said illegal content includes one or more of: a computer virus, a worm, a Trojan, a banned computer file, a banned word, a banned combination of words and a banned image.

* * * * *

UNITED STATES PATENT AND TRADEMARK OFFICE
CERTIFICATE OF CORRECTION

PATENT NO. : 7,093,121 B2
APPLICATION NO. : 10/041482
DATED : August 15, 2006
INVENTOR(S) : Barton et al.

It is certified that error appears in the above-identified patent and that said Letters Patent is hereby corrected as shown below:

col. 7, line 3 replace "computer;" with --computer,--;
    col. 7, line 5 replace "computer to accent" with --computer to accept--;
    col. 7, line 7 replace "computer;" with --computer,--;
    col. 7, line 26 replace "comnuter" with --computer--;
    col. 7, line 26 delete "s'" before "symmetric" and after "said";
    col. 7, line 31 replace "recosnized" with --recognized--;
    col. 7, line 42 replace "HITPS" with --HTTPS--;
    col. 8, line 20 replace "comnuter" with --computer--;
    col. 8, line 6 replace "encrvuted" with --encrypted--;
    col. 8, line 65 replace "is;" with --is:--;
    col. 9, line 1 replace "promoting" with --prompting--;
    col. 9, line 2 replace "comnuter" with --computer--;
    col. 10, line 1 replace "symmetric," with --symmetric--;
    col. 10, line 2 replace "comnuter" with --computer--;
    col. 10, line 7 replace "ideal" with --illegal--;
    col. 10, line 10 replace "Proxy" with --proxy--.

Signed and Sealed this

Second Day of February, 2010

David J. Kappos
*Director of the United States Patent and Trademark Office*